United States Patent [19]

Gardea, II et al.

[11] Patent Number: 5,446,868
[45] Date of Patent: Aug. 29, 1995

[54] NETWORK BRIDGE METHOD AND APPARATUS

[75] Inventors: Raymond A. Gardea II, Winston-Salem; Martin D. Covington, Jr., Rural Hall; Brent W. Carter, Jamestown; Forrest W. Bowling, Winston-Salem, all of N.C.

[73] Assignee: R. J. Reynolds Tobacco Company, Winston-Salem, N.C.

[21] Appl. No.: 943,635

[22] Filed: Sep. 11, 1992

[51] Int. Cl.$^6$ .................... G06F 13/42; G06F 15/173
[52] U.S. Cl. ............................ 395/500; 364/222.2; 364/228; 364/229; 364/240.8; 364/242.95; 364/260.9; 364/284.4
[58] Field of Search ............... 395/500, 800, 200; 370/85.13

[56] References Cited

U.S. PATENT DOCUMENTS

| | | | |
|---|---|---|---|
| 4,897,834 | 1/1990 | Peterson et al. | 370/85.1 |
| 4,942,552 | 7/1990 | Merrill et al. | |
| 5,021,949 | 6/1991 | Morten et al. | 395/200 |
| 5,058,108 | 10/1991 | Mann et al. | 370/85.1 |
| 5,086,426 | 2/1992 | Tsukakoshi et al. | 370/85.13 |
| 5,185,860 | 2/1993 | Wu | 395/200 |

OTHER PUBLICATIONS

*Today, A Digest of What's New At Allen–Bradley*, vol. 5, No. 3, 1992.
*SuperLAT TM /DOS User's Guide*, Version 2.4, Meridian Technology Corporation, 1990.
*Standard Driver Software, User's Manual*, Allen–Bradley, Cat. No. 6001–F1E, Dec. 1989.
*Data Highway/Data Highway Plus Protocol and Command Set, Reference Manual*, Allen–Bradley, 1988.

Primary Examiner—Parshotam S. Lall
Assistant Examiner—Ayni Mohamed

[57] ABSTRACT

A network bridge between a DEC Ethernet network using LAT protocol and an Allen-Bradley Data Highway/Data Highway Plus (DH/DH+) network eliminates the need to use a DEC terminal server and Allen-Bradley KE/KF2 interface with their low data rates. A terminal server emulator is electrically connected to the DEC Ethernet network for stripping the LAT protocol from the DEC Ethernet network and provide DF1 formatted data. A converter module is electrically connected between the terminal server emulator and the DH/DH+ network for converting the DF1 data into DH/DH+ protocol data and for transmitting this data to the DH/DH+ network. The converter also converts data using DH/DH+ protocol which is received from the DH/DH+ network into DF1 data and transmits this data to the terminal server emulating means. The terminal server emulating means then places the DF1 formatted data into LAT packets and transmits the LAT packets to the Ethernet network. The terminal server preferably includes a commercially available LAT engine. The terminal server emulator and the converter preferably run on a general purpose microcomputer which includes an Ethernet interface board and an Allen-Bradley interface board.

19 Claims, 17 Drawing Sheets

NETWORK BRIDGE METHOD AND APPARATUS

FIELD OF THE INVENTION

This invention relates to data processing systems, and more particularly to communications networks for data processing systems.

BACKGROUND OF THE INVENTION

Local area networks are widely used for communicating among data processing systems and peripherals. As is well known to those having skill in the art, local area networks can use one or more of many network protocols for passing data along the network. In the computer integrated manufacturing environment, two widely used network protocols are the LAT protocol and the Data Highway/Data Highway Plus (DH/DH+) protocol.

As is well known to those having skill in the art, LAT is a name given to Digital Equipment Corporation's (DEC) Ethernet-based terminal server networking protocol. One or more host computers, typically a DEC or DEC compatible computer, communicates with one or more terminal servers over a DEC Ethernet network using LAT protocol at rates of up to 10 megabits per second. LAT packets are passed between DEC hosts and their terminal servers on the DEC Ethernet network. The data in the LAT packets use the DF1 data format when communicating with an Allen-Bradley DH/DH+ network. The DF1 format conforms closely to the ANSI X.28 standard. It combines the features of subcategories D1 (data transparency) and F1 (2-way simultaneous transmissions with embedded responses).

Another widely used local area network in computer integrated manufacturing systems is the Allen-Bradley Data Highway/Data Highway Plus (DH/DH+) network. The DH/DH+ network allows peer-to-peer communication among up to 64 nodes using a half-duplex polled protocol and rotation of link mastership, and operates at a data rate of 57.6 Kbaud. The DH/DH+ network is used to connect Allen-Bradley Programmable Logic Controllers (PLC) in a network. The DH/DH+ protocol is described in a reference manual entitled *Data Highway/Data Highway Plus Protocol and Command Set*, publication 1770-6.5.16, November 1988, published by Allen-Bradley Company, Inc., Milwaukee, Wis., the disclosure of which is hereby incorporated herein by reference.

Because of the widespread use of the DEC Ethernet network and the Allen-Bradley DH/DH+ network in computer integrated manufacturing environments, there is a need for a bridge between the networks. Such a bridge would connect the two networks to allow two-way communications between host computers running on the DEC Ethernet network, and Allen-Bradley programmable logic controllers running on the DH/DH+ network. Both the DEC Ethernet network and the Allen-Bradley Data Highway/Data Highway Plus network are high speed networks, with communication speeds of 10 megabits per second and 57.6 Kbaud respectively. Accordingly, in order to avoid a communications bottleneck between the two networks, it is essential that the bridge operate at high speed.

Unfortunately, to the best of the inventors' knowledge the only known bridge between the two networks produces a communications bottleneck therebetween. In particular, DEC presently markets a hardware link between the two networks in the form of a DEC terminal server which is connected to an Allen-Bradley 1785-KE module or an Allen-Bradley 1770-KF2 module. Unfortunately, the Allen-Bradley 1770-KF2 module is only capable of transmitting and receiving data asynchronously at 9600 baud, while the Allen-Bradley 1785-KE module has a 19.2 Kbaud limit. This is much lower than the 10 megabit/sec and 57.6 Kbaud rates of the networks themselves. Accordingly, communication between the networks is limited, resulting in equipment capacity limitations and an inability to accurately control the equipment connected to the networks. The DEC terminal and KE/KF2 modules are also relatively expensive, so that it is not cost effective to eliminate the bottleneck by adding multiple DEC terminal servers and/or multiple KE/KF2 modules between the networks. Moreover, multiple KE/KF2 modules create excessive overhead on the network, thereby slowing overall communications.

SUMMARY OF THE INVENTION

The invention is a network bridge which eliminates the need to use a DEC terminal server and Allen-Bradley KE/KF2 interface module, with their 19.2 Kbaud/9600 baud limitations, to bridge a DEC Ethernet network and an Allen-Bradley DH/DH+ network. The network bridge includes a terminal server emulator, which is connected to the DEC Ethernet network, for stripping the LAT protocol from the DEC Ethernet network communications, leaving DF1 formatted data. The network bridge also includes a converter which is connected between the terminal server emulator and the Allen-Bradley DH/DH+ network, for converting the DF1 data into DH/DH+ protocol data and for transmitting this data to the Allen-Bradley DH/DH+ network. The converter also converts data using DH/DH+ protocol which is received from the DH/DH+ network, into DF1 formatted data, and transmits this data to the terminal server emulating means. The terminal server emulating means then places the DF1 formatted data in LAT packets and transmits the LAT packets to the DEC Ethernet network. Accordingly, by emulating a terminal server and not requiring an actual terminal server and an Allen-Bradley KE/KF2 module, LAT protocol encapsulated data can be converted to Allen-Bradley Data Highway Plus data and back at high speed and low cost.

In a preferred embodiment of the network bridge of the present invention, the terminal server emulator is a commercially available LAT engine such as SuperLAT TM/DOS, marketed by Meridian Technology Corporation, Chesterfield, Mo., in combination with a LAT engine control module, that accept data from the DEC Ethernet network through multiple logical connections and strip the LAT protocol from the received packet, leaving DF1 data. Preferably, the converter is a software module which converts DF1 data into DH/DH+ protocol data and converts DH/DH+ protocol data into DF1 format.

The terminal server emulator and the converter preferably run on a general purpose microcomputer, such as a standard 80386-based microcomputer. An Ethernet interface board and an Allen-Bradley interface board are connected to the bus of the microcomputer. The Ethernet interface board provides a physical interface between the DEC Ethernet network and the network bridge, while the Allen-Bradley interface board provides a physical interface between the network bridge and the Allen-Bradley DH/DH+network. One or more Ethernet boards running multiple LAT sessions, and/or multiple and Allen-Bradley interface boards, may be used to communicate with several DEC Ethernet networks and with several Allen-Bradley DH/DH+ networks. Accordingly, the network bridge of the present invention may be implemented using standard hardware, commercially available software and custom designed software described in detail herein, to provide a high speed, low cost bridge between the networks and reduce or eliminate data bottlenecks.

DETAILED DESCRIPTION OF A PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
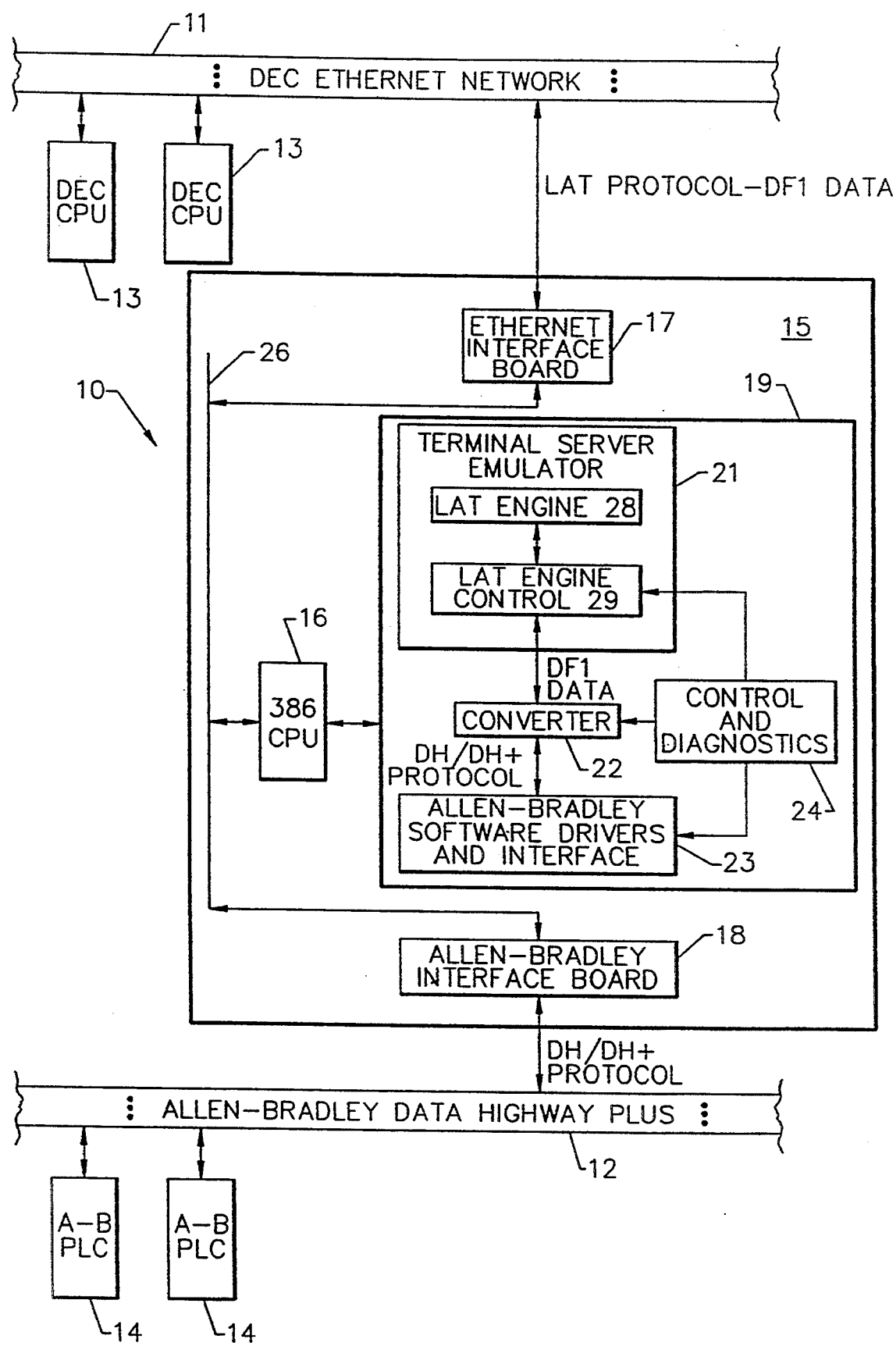
FIG. 1 is a block diagram of a computer integrated manufacturing system including a network bridge according to the present invention.

FIG. 1 illustrates a block diagram of a computer integrated manufacturing system including a network bridge according to the present invention. As shown in FIG. 1, network bridge 10 is used to connect a DEC Ethernet network 11, which transmits DF1 format data using LAT protocol, to an Allen-Bradley Data Highway/Data Highway Plus (DH/DH+) network 12 using DH/DH+ protocol. It will be understood by those having skill in the art that DEC Ethernet network 11 also typically transmits other data to other devices using other protocols. A plurality of DEC or DEC compatible central processing units (CPU) 13 such as minicomputer, mainframe or microcomputer systems are attached to network 11. A plurality of Allen-Bradley or Allen-Bradley compatible programmable logic controllers (PLC) 14 are attached to network 12 to control manufacturing equipment (not shown in FIG. 1).

The bridge 10 comprises a microcomputer 15 such as an IBM compatible personal computer having a central processing unit 16 such as an Intel 80386 microprocessor or the like. As is well known to those having skill in the art, computer 15 includes an internal data bus 26 to which cards or boards may be attached. An Ethernet interface board 17 provides physical connection to network 11, and an Allen-Bradley interface board 18 provides physical connection to network 12. Ethernet interface board 17 may be implemented using an Ethernet card for an AT bus, marketed by DEC, Western Digital, 3COM and many others. Allen-Bradley interface board 18 is preferably an Allen-Bradley 1784-KT card, also referred to herein as a "KT Card". It will be understood by those having skill in the art that multiple Ethernet interface boards 17 and multiple Allen-Bradley interface boards 18 may be used.

The software residing in memory 19 of computer 15 and executing on central processor 16 includes four main modules: a terminal server emulator module 21, a converter module 22, Allen-Bradley software drivers (i.e. software drivers for the Allen-Bradley interface board) and interface module 23, and control and diagnostics module 24. Terminal server emulator module 21 provides an interface to the LAT protocol and strips off the LAT information from the received data packet, leaving data in the DF1 format. The DF1 data is then passed to converter module 22 which converts the DF1 data into DH/DH+ protocol. The converted data in DH/DH+ protocol is passed to the Allen-Bradley software drivers and interface module 23. The reverse process is followed for data passing from the Allen-Bradley network 12 to the DEC network 11, as described more fully below.

In a preferred embodiment, terminal server emulator module 21 is implemented using a LAT engine 28 such as the SuperLAT TM /DOS software, version 2.4, marketed by Meridian Technology Corporation, 11 McBride Corporate Center Drive, Suite 250, Chesterfield, Mo. 63005, which is described in the SuperLAT TM-/DOS Users Guide, Document No. 6718, August 1991, the disclosure of which is hereby incorporated herein by reference. The SuperLAT TM /DOS software in conjunction with LAT engine control module 29, emulate a DEC terminal server which offers multiple logical connections. It strips off the LAT protocol and provides a datastream in the. DF1 format, and logical connection information. LAT engine control module 29, described below, provides control and interface for the LAT engine 28.

Converter 22 uses the logical connection information and the DFt format data to translate the DF1 datastream into Allen-Bradley application layer data. Software drivers 23 also route the application data layer to one of many interface boards 18, only one of which is shown in FIG. 1. Also, data passes from one of several interface boards 18 routed through the converter 22 to the appropriate one of several logical connections on the DEC Ethernet using the LAT protocol. A high speed, low cost bridge between the DEC Ethernet network 11 and the Allen-Bradley Data Highway Plus network 12 is thereby provided.

Having described the overall architecture of the network bridge of the present invention, each of the software modules 21-24 of the present invention will now be described. Terminal server emulator module 21 will first be described, followed by converter module 22, Allen-Bradley software drivers and interface module 23 and control and diagnostics module 24.

Terminal Server Emulator Module 21

Figure 2:
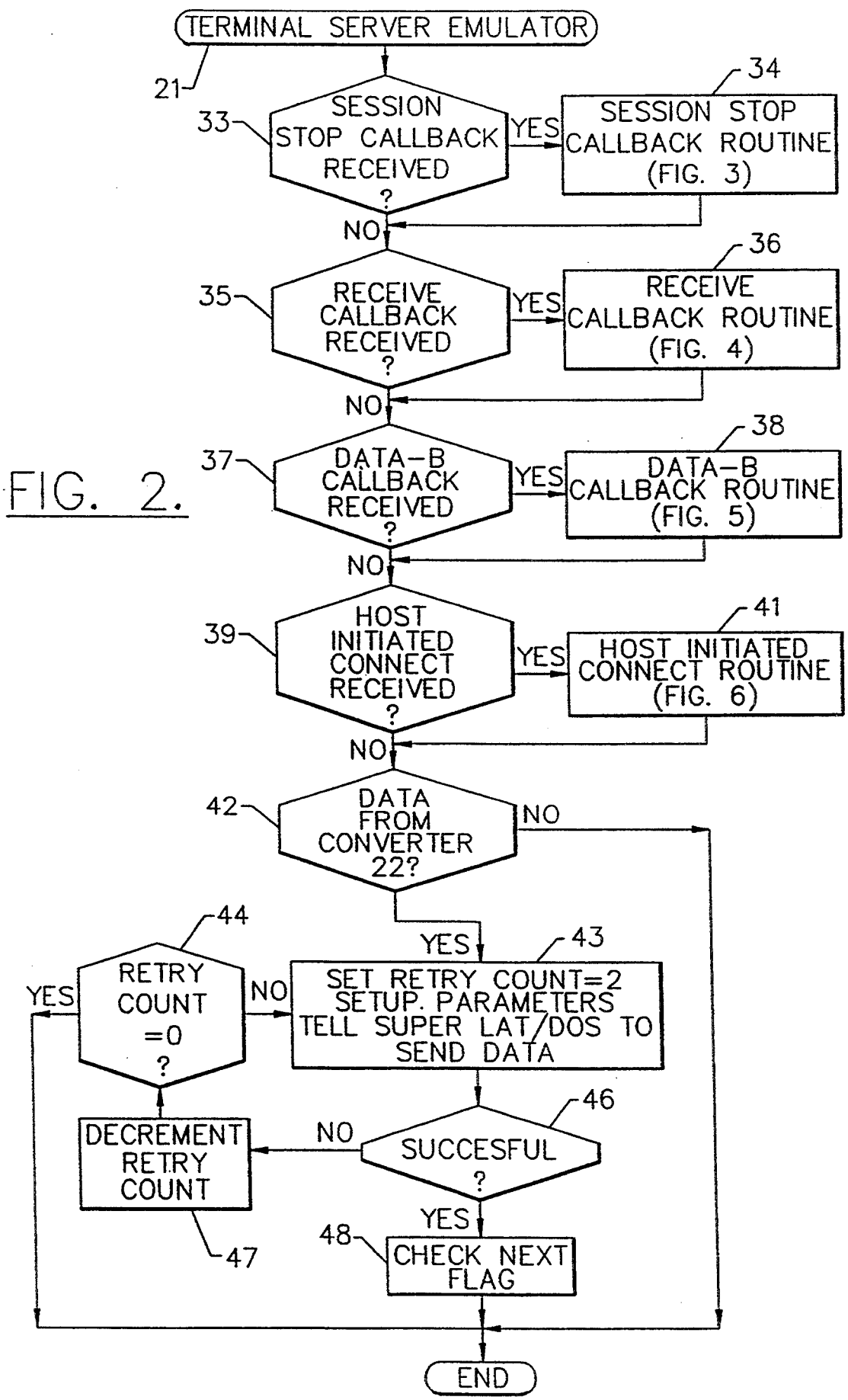
FIGS. 2–6 illustrate operations of the Terminal Server Emulator module of FIG. 1.

Terminal server emulator module 21 includes LAT engine control module 29 which interface with LAT engine 28 (SuperLAT TM /DOS) to strip the LAT protocol from the DEC Ethernet network 11 and provide DF1 format data which is applied to converter module 22. Terminal server emulator module 21 also applies LAT packet protocol format to DF1 data received from converter 22 for passing to Ethernet interface board 17 and DEC Ethernet network 11. FIG. 2 describes the detailed processing performed by terminal server emulator 21, and specifically by control module 29.

Figure 3:
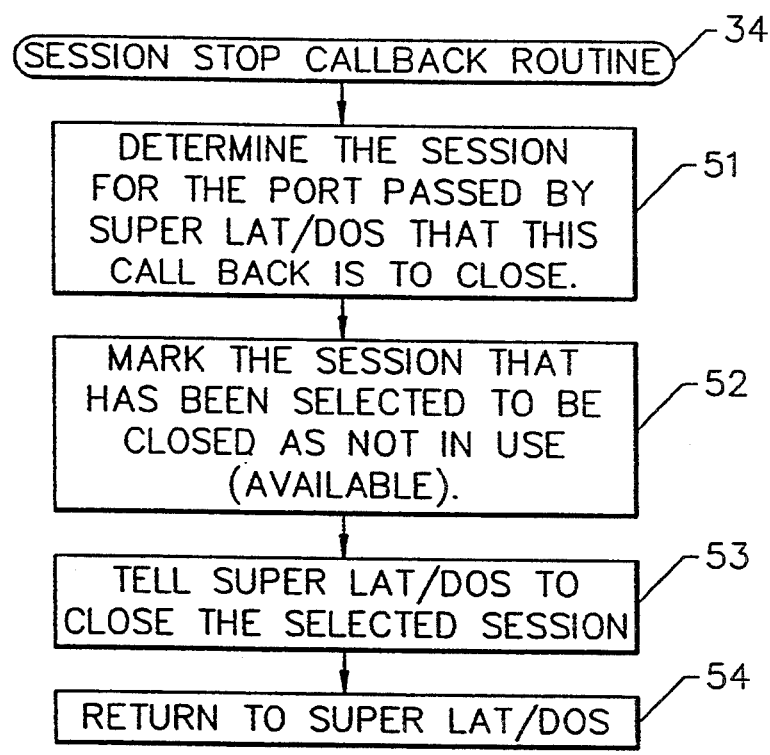
Figure 4:
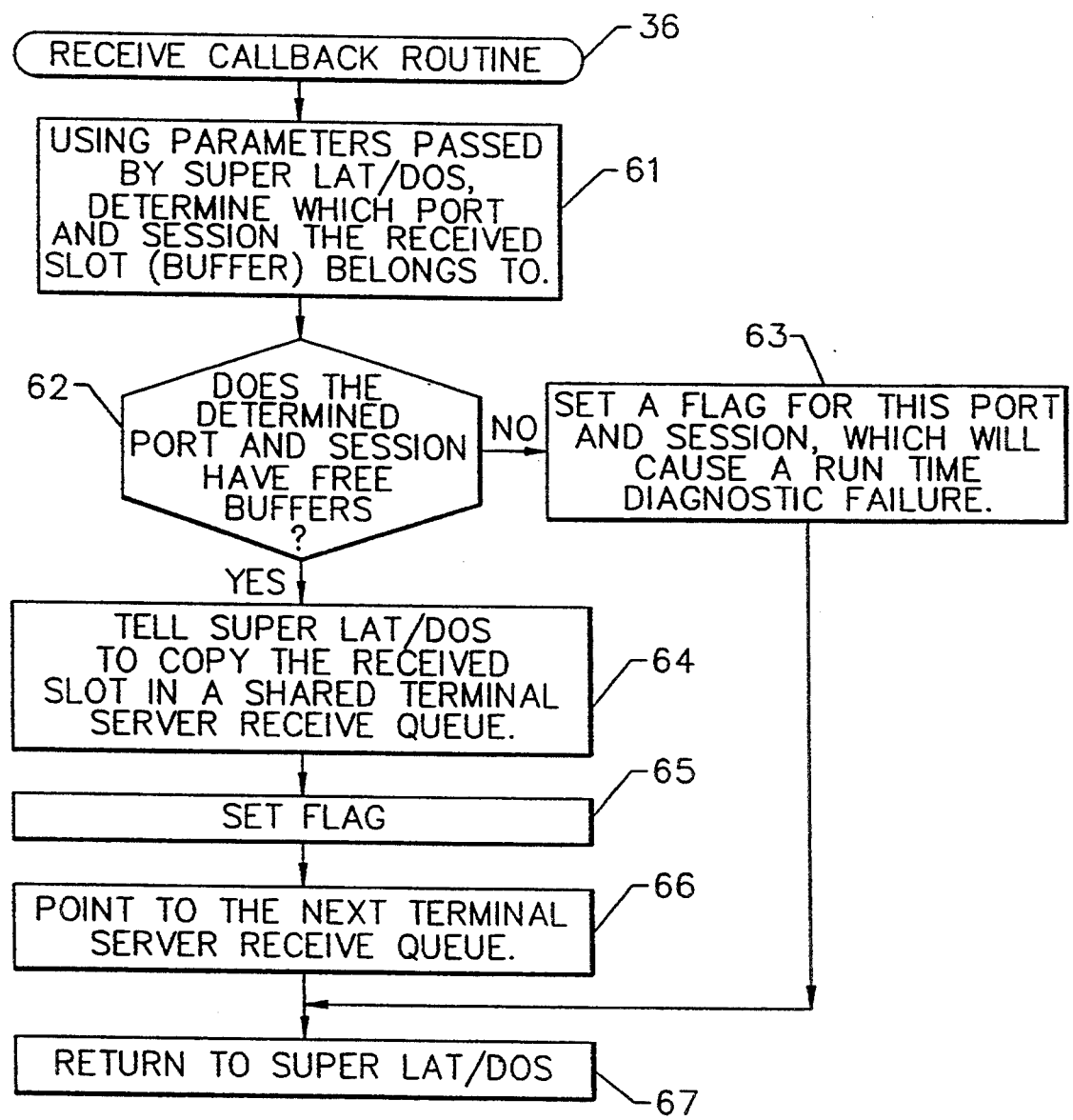

If a session stop callback is received (Block 33), the session stop callback routine of FIG. 3 is initiated at Block 34. SuperLAT TM /DOS issues a session stop callback whenever a session stops. Normally this callback occurs when a remote session sends a stop. It will also occur any time a circuit fails due to excessive retransmissions. If a receive callback is received (Block 35), the receive callback routine of FIG. 4 is initiated at Block 36. SuperLAT TM /DOS issues a receive notify callback whenever a slot of characters is received. If a "data-B" callback is received (Block 37), then a "data-B" callback routine 38 is initiated at FIG. 5. SuperLAT TM /DOS issues a data-B callback whenever a host system attempts to configure one of the parts created by the terminal server emulator 21. If a host initiated connect is received (Block 39), then the host initiated connect routine of FIG. 6 is initiated at Block 41. SuperLAT TM /DOS issues a host initiated connect whenever host-initiated request is received for an object offered by the server application. It will be understood by those having skill in the art that the processing described above in connection with Blocks 33-41 is preferably interrupt driven. Accordingly, this processing occurs asynchronously, in response to an appropriate interrupt, rather than sequentially as depicted in FIG. 2.

Figure 17:
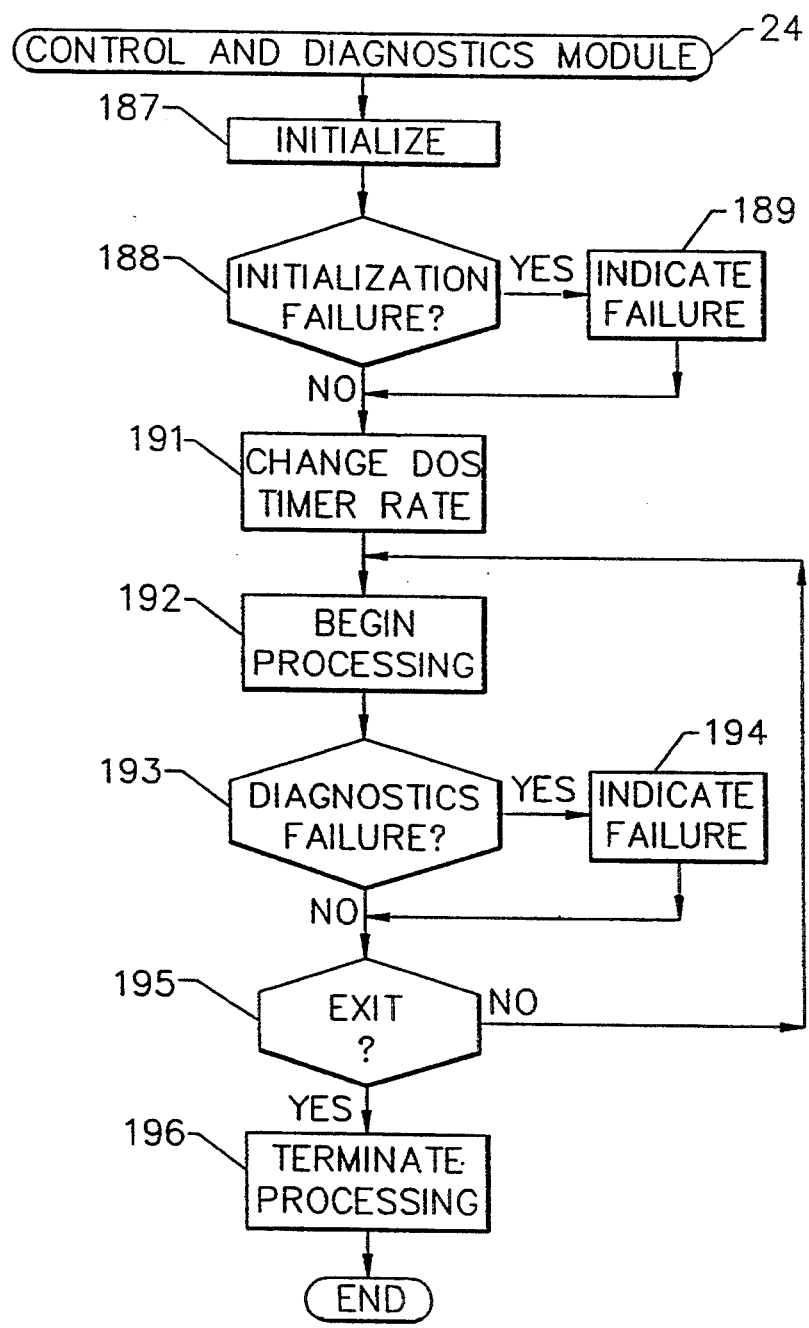
FIG. 17 illustrates operations of the Control and Diagnostics module of FIG. 1.

After the interrupts are processed, a check is made at Block 42 as to whether there is any data from the converter module 22 that needs to be sent over the Ethernet interface board 17 using the LAT protocol. Each port and session is checked. If there is no data, then control returns to Block 33. If data is to be sent, then at Block 43 "retry count" is set to 2, parameters are set up, and SuperLAT TM /DOS is told to send the data with an origin of the port and session. If the data is successfully transmitted (Block 46), pointers are adjusted to check the next flag at Block 48, and control returns to the control and diagnostics module (FIG. 17). If data transmission is unsuccessful (Block 46), then the retry count is decremented and an attempt is made again at Block 43.

Referring now to FIG. 3, the session stop callback routine 34 first determines the session for the port passed by SuperLAT TM /DOS that this callback is to close at Block 51. The session that has been selected to be closed is marked as "not in use" i e. available, at Block 52. SuperLAT TM /DOS is then told to close the selected session at Block 53 and control is returned to SuperLAT TM /DOS at Block 54.

The receive callback routine 36 uses parameters passed by SuperLAT TM /DOS to determine which port and session the received slot (buffer) belongs to at Block 61. If the determined port and session does not have free buffers (Block 62), then a flag is set which will cause a run time diagnostic failure and an exit is performed without saving the buffer at Block 63.

On the other hand, if the determined port and session have free buffers, then at Block 64 SuperLAT TM /DOS is told to copy the received slot that it has ready for the determined port and session in a shared terminal server receive queue. The shared terminal server receive queue is used by the converter module 12 and the terminal software emulator module 21 for data transfer. Then, at Block 65, a flag is set telling the converter module that data is ready and valid. Another data member is set with the number of bytes received. The ready valid flag and the bytes received data member are then located in the terminal server receive queue. Then, at Block 66, the next terminal server receive queue is pointed to, so that the processing is ready for the next received callback. Control is returned to SuperLAT TM /DOS at Block 67.

Figure 5:
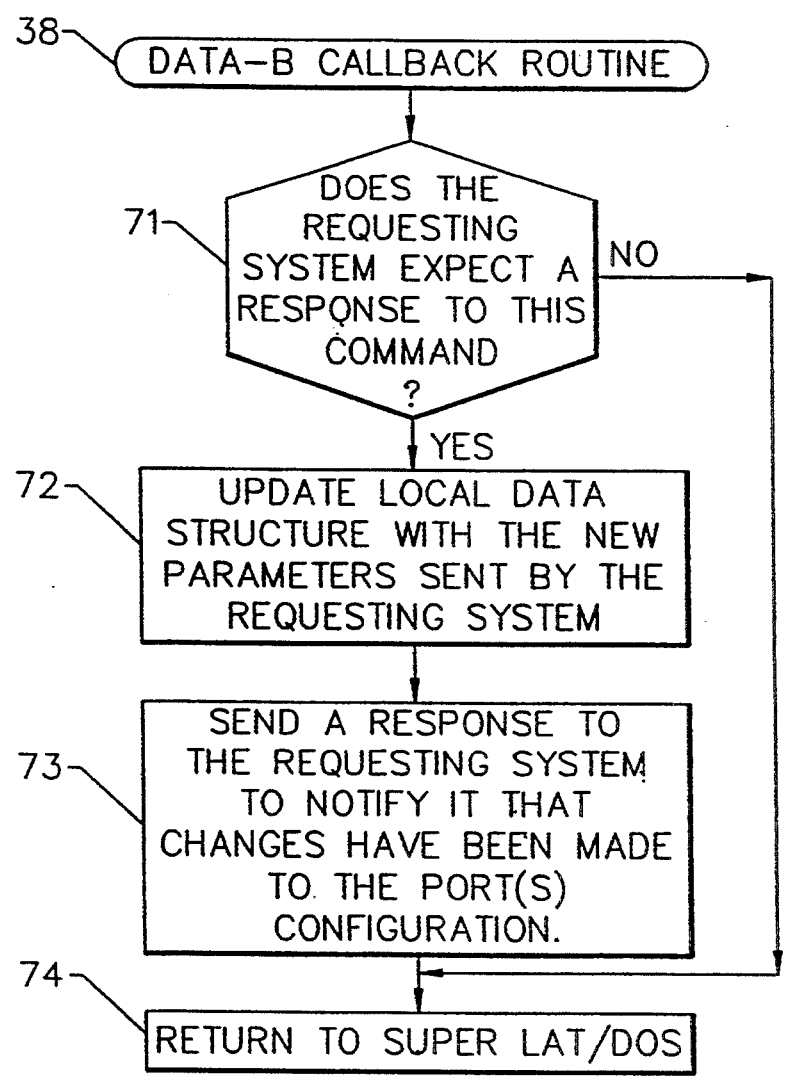
Figure 6:
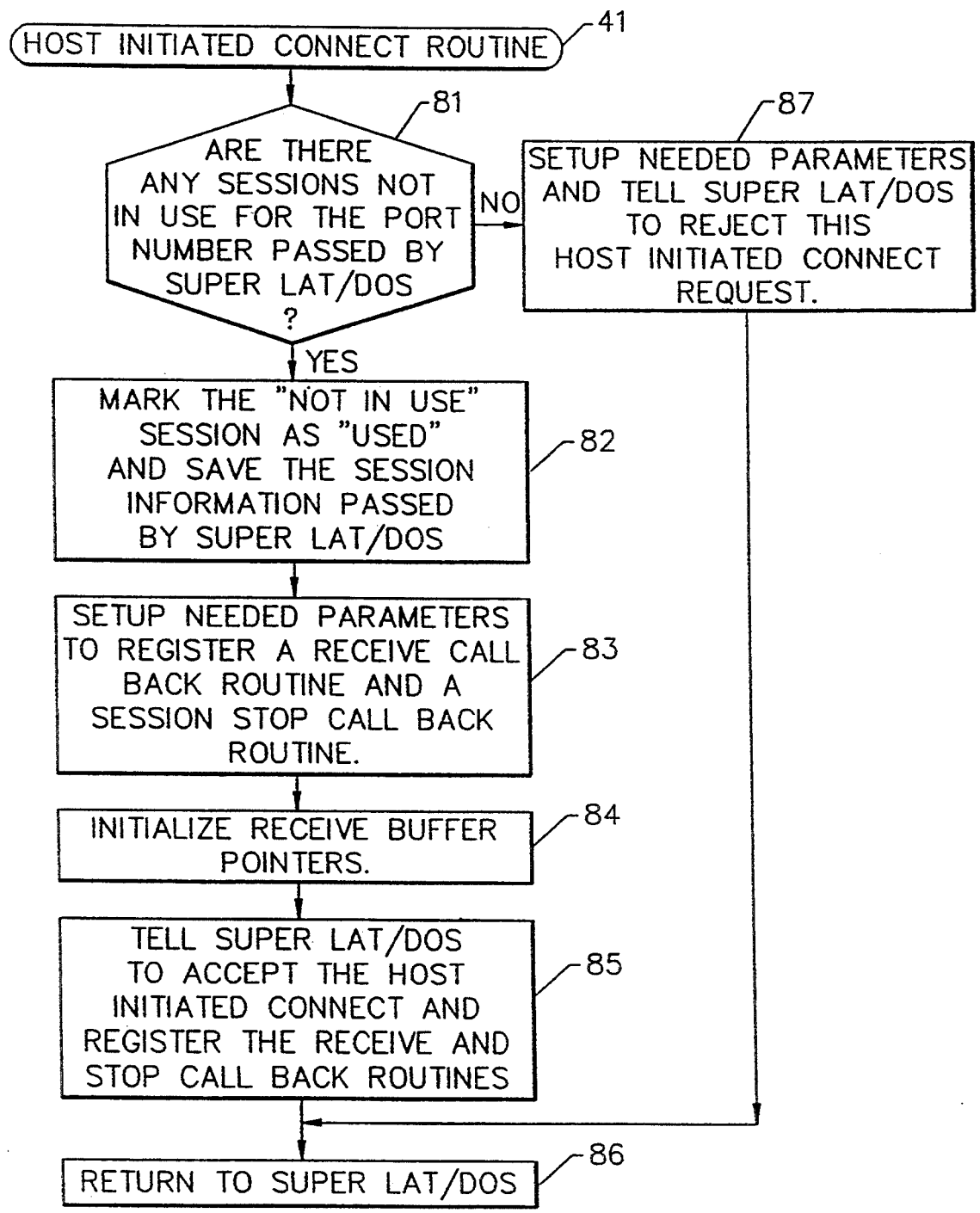

Referring to FIG. 5, the data-B callback routine 38 determines whether the requesting system expects a response to the command at Block 71. If not, control is returned to SuperLAT TM /DOS (Block 70). If yes, a local data structure is updated with a new parameters sent by the requesting system at Block 72, and a response is sent to the requesting system to notify it that changes have been made to the port's configuration at Block 73. Control is returned to SuperLAT TM /DOS at Block 74.

Referring to FIG. 6, the host initiated connect routine 41 first determines if there are any sessions not in use for the port number passed by SuperLAT TM /DOS at Block 81. If yes, the session found to be "not in use" is marked as "used" and the session information passed by SuperLAT TM /DOS is saved at Block 82. The needed parameters are set up to register a receive callback routine and a session stop callback routine at Block 83. The shared data area is called a session control block (SCAB). At Block 84, the received buffer pointers are initialized in the SCB so that SuperLAT TM /DOS will know where to put data it receives for this port and session. At Block 85, with all parameters set up, SuperLAT TM /DOS is told to accept the host initiated connect and register the receive and stop callback routines. Control is then returned to SuperLAT TM /DOS at Block 86. Alternatively, if there are not any sessions not in use for the port number passed by SuperLAT TM-/DOS at Block 81, the needed parameters are set up and SuperLAT TM /DOS is told to reject this host initiated connect request at Block 87.

Converter Module 22

The detailed operation of the converter module 22 (FIG. 1), will now be described. The converter module converts data in DF1 format which is received from the terminal server emulator module 21 into data having DH/DH+ protocol for use by the Allen-Bradley software drivers and interface module 23. The converter module 22 also performs the reverse process by converting data having DH/DH+ protocol which is received from the Allen-Bradley software drivers and interface module 23 into DF1 data for use by terminal server emulator 21 in driving Ethernet interface boards 17.

The data in the LAT packets, which pass between the DEC CPU 13 and the bridge 10 on the DEC Ethernet network 11, follows the DF1 link protocol. This protocol conforms closely to the ANSI X.28 standard. It combines the features of subcategories D1 (data transparency) and F1 (two-way simultaneous transmission with embedded responses). The Allen-Bradley command data block which is received by the bridge 10 from the DEC CPU 13 is passed directly onto the Data Highway Plus network 12.

Prior to describing the operation of converter module 22, the DF1 protocol will be described as will the DH/DH+ protocol. The DF1 protocol is a full duplex character oriented protocol. It uses the ASCII control codes listed in TABLE 1.

TABLE 1

| Abbreviation | Hexadecimal Value | Binary Value |
|---|---|---|
| STX | 02 | 0000 0010 |
| ETX | 03 | 0000 0011 |
| ENQ | 05 | 0000 0101 |
| ACK | 06 | 0000 0110 |
| DLE | 10 | 0001 0000 |
| NAK | 15 | 0001 0101 |

The DF1 protocol combines the ASCII control codes listed in TABLE 1 into Control Symbols and Data Symbols. A symbol is a sequence of one or more bytes having a specific meaning to the DF1 linked protocol described below. Each symbol is composed of component characters sent one after another with no other characters between them. TABLE 2 defines the symbols and their types used in the DF1 protocol.

TABLE 2

| Symbol | Type | Meaning |
|---|---|---|
| DLE STX | control | Sender symbol that indicates the start of a message. |
| DLE ETX BCC | control | Sender symbol that terminates a message. |
| DLE ACK | control | Response symbol which signals that a message was successfully received. |
| DLE NAK | control | Response symbol which signals that a message was not received successfully. |
| DLE ENQ | control | Sender symbol that requests retransmission of a response symbol from the receiver. |
| DLE DLE | data | Symbol that represents the data value 10 hex. |
| APP DATA | data | Single character data values between 00-0F and 11-FF hex. |

Each DF1 message packet starts with a DLE STX symbol and ends with a DLE ETX BCC symbol, with application layer data packed between them. Data symbols can only occur in a message packet. Response symbols can also be found inside a message packet, but they are not considered part of the message packet. The DF1 type packets of Table 3 are used to pass information between the bridge 10 and DEC CPU 13 via DEC Ethernet network 11.

TABLE 3

| DLE | STX | DST. | SRC. | CMD. | STS. | TNS | DATA... | DLE | ETX | BCC |
|---|---|---|---|---|---|---|---|---|---|---|

Figure 7:
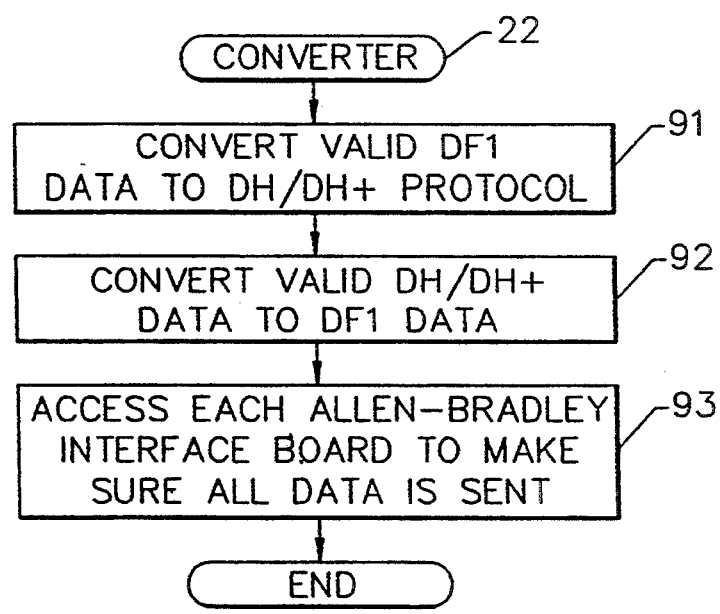
FIGS. 7–10 illustrate operations of the Converter module of FIG. 1.

Referring now to FIG. 7, the converter module 22 of FIG. 1 converts valid DF1 data to DH/DH+ protocol at Block 91. The converter module also converts valid DH/DH+ data to DF1 data at Block Each Allen-Bradley interface board 18 is also accessed to make sure all data is sent at Block 93. Detailed operations for the conversion process will now be described.

Figure 8:
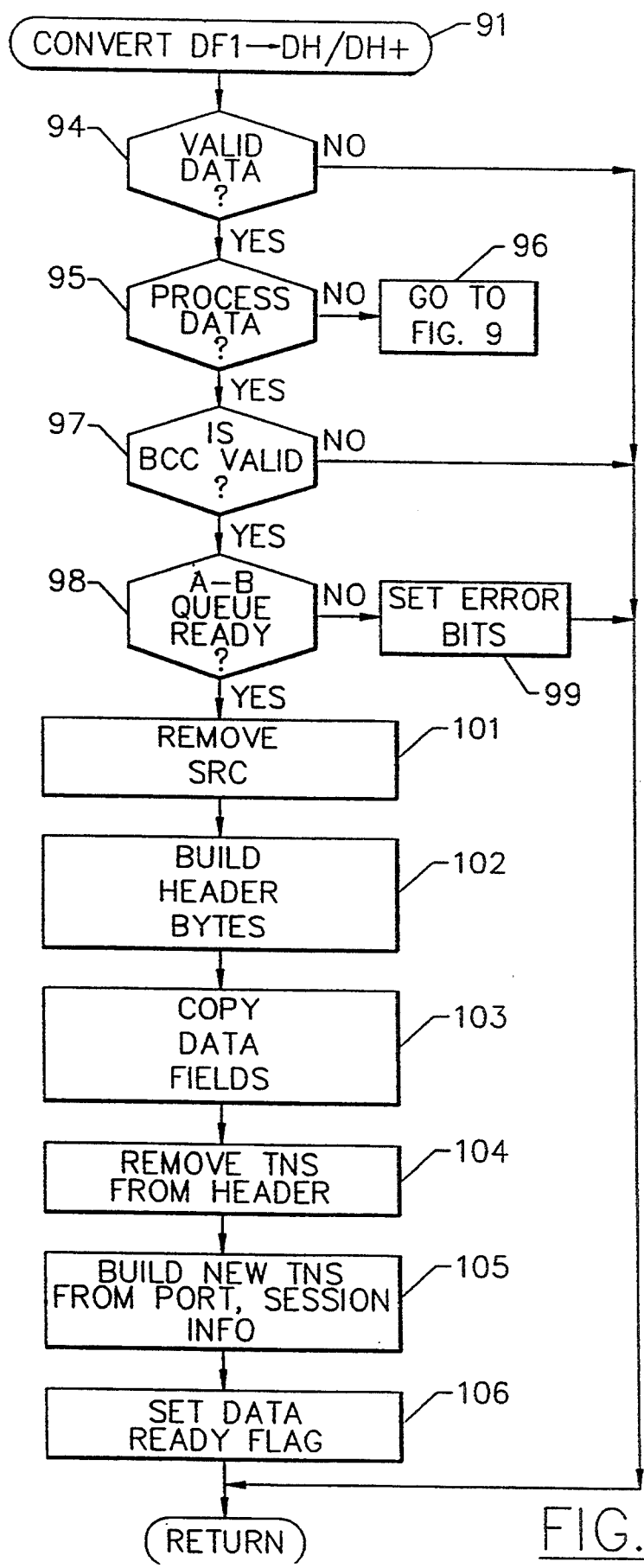
Figure 9:
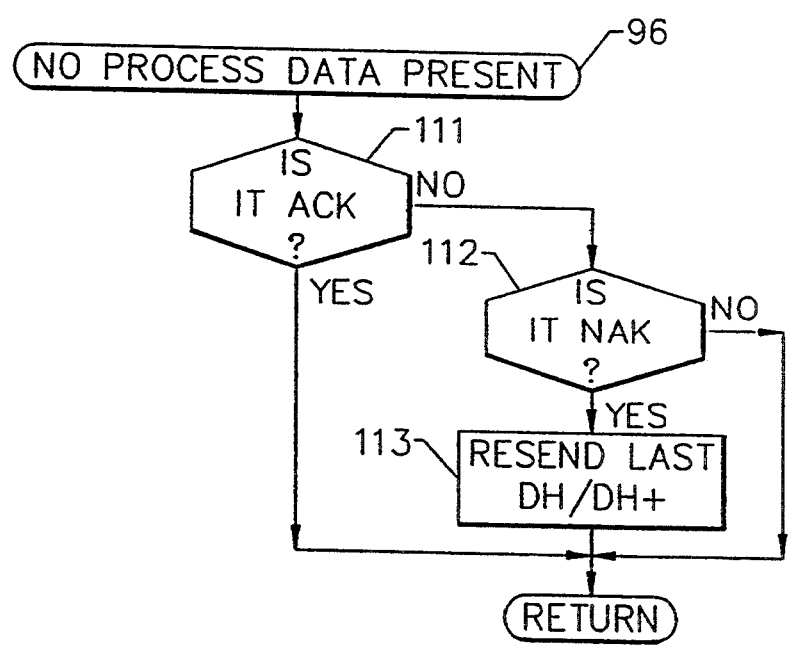

Referring now to FIG. 8, the detailed operation for converting DF1 data to DH/DH+ data (Block 91 of FIG. 7) will now be described. A test is first made, at Block 94, to see if a DF1 data packet is valid. If yes, then at Block 95, a test is made as to whether the data is process data. If not, processing of FIG. 9 is performed (Block 96). If process data was present, then, at Block 97, the block check character (BCC) of the incoming message packet is checked against a calculated BCC. If these two values do not match, a response symbol that the message was not received (DLE NAK) is generated and sent to the DEC CPU 13. Alternatively, if the BCC was valid, then a data structure is built for the Allen-Bradley Data Highway Plus network 12. Before the data structure is built, a test is made at Block 98 to see if the Allen-Bradley queue is ready. If not, then at Block 99 bits are set. If yes, the source field (SRC) is removed from the DF1 data stream and saved for the response message at Block 101. The header bytes are built at Block 102 and the data fields are copied at Block 103. The transaction number (TNS) is removed from the header at Block 104 and a new transaction number is built from the port and session information at Block 105. The data ready flag is then set at Block 106.

As described above, several of the sender symbols are stripped from the DF1 data packet, i.e. the "Start of Message" and "Terminating" symbols. The transaction number (TNS) is also replaced with a pseudo transaction number generated internally. The pseudo transaction number is calculated from the session/port from which the data was received, and an internally generated modulo number (up to modulo 256). In the present implementation, a modulo 16 number is used because 16 different buffer areas and data structures are present for each session/port which is supported.

The actual transaction number (TNS) sent from the DEC CPU 13 is saved for future use when the response message package is built. The upper byte of the pseudo transaction number contains the logical port and session numbers from which the data was received. The port number is placed in the lower nibble of the high byte of the TNS, and the session number is placed in the upper nibble of the high byte of the TNS. A lower byte of the pseudo TNS contains a distinct number that is incremented with each transaction, i.e. the modulo 16 number. After the data has been converted for the Allen-Bradley Data Highway Plus, it is placed in the dual port RAM located in the Allen-Bradley interface board be. The memory map of the dual port RAM transmit box is shown in TABLE 4.

TABLE 4

| Offset 0 | Length - Low Byte |
|---|---|
| Offset 1 | Length - High Byte |
| Offset 2 | Always Zero |
| Offset 3 | Always Zero |
| Offset 4 | Packet Destination |
| Offset 5 | Control Byte (5) |
| Offset 6 | Type - Always Zero |
| Offset 7 | Link Service Access |
| Offset 8 | PCCC Command Byte |
| Offset 9 | Message Status |
| Offset 10 | Transaction Number Low and High Bytes |
| Offset 12 | Command Extension |
| Offset 13 | D |
| | A |
| | T |
| | A |

The dual port RAM data structure is similar to the conversion routine's output. It should be noted that the conversion routine 22 takes the dual DLE symbols found throughout the entire DF1 data packet, and converts them to a single character with the data value of 10 hexadecimal. Each field in this structure is described in TABLE 5.

TABLE 5

| | |
|---|---|
| Offset 0 and Offset 1 - | Contain the length of the data structure to send in bytes. |
| Offset 2 and Offset 3 - | Are always set to zero. |
| Offset 4 - | Contains the Destination Byte (DST). |
| Offset 5 - | Control byte which is set to five in order to send packet. |
| Offset 6 - | Packet type which is set to zero. |
| Offset 7 - | Link Service Access Packet which is zero for an onlink destination. |
| Offset 8 - | Contains the PCCC command byte which is a copy of the Command (CMD) field found in the DF1 data packet from the DEC CPU. |
| Offset 9 - | Message status byte which is a copy of the status byte (STS) from the DF1 packet received from the DEC CPU. |
| Offset 10 & Offset 11 - | Contain the two byte transaction number which is filled with the internally built TNS described above. |
| Offset 12 and below - | Contains the application data found in the DF1 packet. |

The conversion routine also takes the source field (SRC) from the DF1 packet and saves it for the response message. Thus, an internal data structure is updated that contains the old TNS and SRC along with the session number.

Upon successful conversion, the Allen-Bradley interface board 18 will then be triggered to send a data packet on the Allen-Bradley Data Highway Plus network 12. Some time after the successful transmission of this packet, the destination node will respond with a response message. This response message will in turn trigger an interrupt from the Allen-Bradley interface board 18. In the Allen-Bradley interface board service routine, the response message will be read into internal memory, in the form shown in TABLE 6.

TABLE 6

| | |
|---|---|
| Offset 0 | Length - Low Byte |
| Offset 1 | Length - High Byte |
| Offset 2 | Packet Source |
| Offset 3 | Link Service Access |
| Offset 4 | PCCC Command Byte |
| Offset 5 | Command Status Byte |
| Offset 6 | Transaction Number Low and High Bytes |
| Offset 8 | D A T A |

Each byte in the received data structure is described in TABLE 7.

TABLE 7

| | |
|---|---|
| Offset 0 and Offset 1 - | Contain the length of the data structure received in bytes. |
| Offset 2 - | Contains the source of the response packet. |
| Offset 3 - | Link Service Access Packet which is zero for an onlink destination. |
| Offset 4 - | Contains the PCCC command byte from the response. |
| offset 5 - | Contains the response message status byte. |
| Offset 6 and Offset 7 - | Contain the two byte transaction number which is a copy of the original TNS that caused the response. |
| offset 8 and below - | Contains the response data. |

Referring now to FIG. 9, if the processing at Block 95 indicates that process data is not present (Block 96), then a test is made at Block 111 as to whether it is the ACK symbol. If yes, processing returns. If not, test is made for whether it is the NAK symbol at Block 112. If not, processing returns. If it is the NAK symbol, then the last DH/DH+ packet is resent at Block 113.

Figure 10:
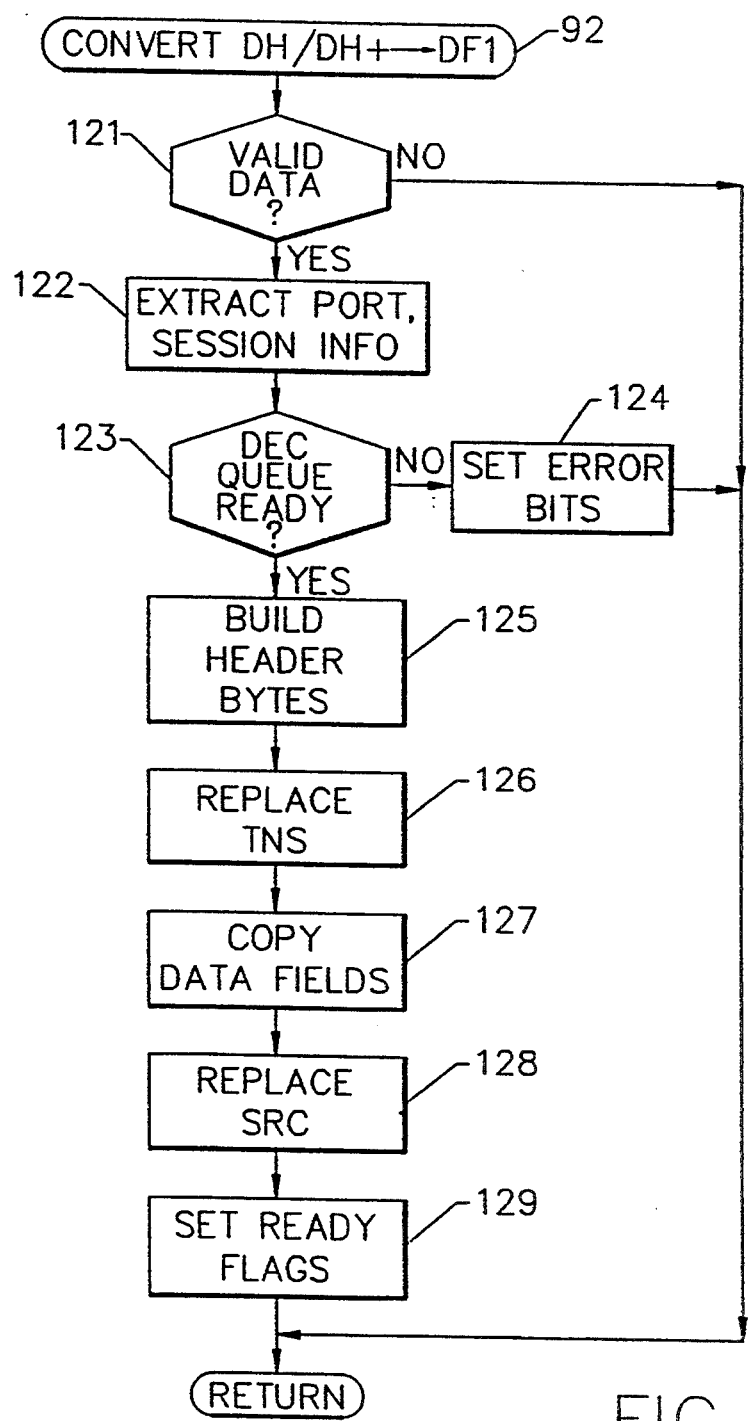

Referring now to FIG. 10, the operations for converting a DH/DH+ datastream to a DF1 datastream (Block 92 of FIG. 7) will now be described. At Block 121, a test is first made as to whether valid data is present. If yes, then the port and session information is extracted out of the pseudo-TNS from the DH/DH+ datastream at Block 122. A test is then made at Block 123 as to whether the DEC queue is ready. If not, error bits are set at Block 124. If yes, then at Block 125 the header bytes are built. A response symbol that signals a successively receive message (DLE ACK) is placed at the start of the DEC response packet. Also appended to this packet is a sender symbol that indicates the start of a message (DLE STX) and a sender symbol that terminates the messages (DLE ETX BCC).

Then, at Block 126, the TNS from the response packet is used to generate a pointer to an internal data structure. The upper byte of the pseudo TNS contains the port and session information and the lower byte contains a simple counter. As was described above, prior to the transmission of the original packet, the TNS and source were placed in a data structure along with the session information. From the data structure pointed to by the TNS pointer, the source filed field (SRC) of the DF1 packet is filled with the original source, and the transmission number field (TNS) of the DF1 packet are set with the original TNS. See Block 128. Because each response message contains the same TNS as the sender message, integrity is maintained.

The destination field (DST) of the DF1 packet is set to the packet source found in the Allen-Bradley response data structure. The command (CMD) and message status (STS) field of the DF1 packet are filled with the PCCC command byte and command status byte from the KT response packet. All the data found in the KT response fields will be placed in the data field of the DF1 packet on a byte by byte basis in the order it was received. Size is found by the length fields in offset 0 and 1. If a data item is found to have a value of 10 hexadecimal, it will be replaced by the symbol DLE DLE described above. Ready flags are then set at Block 129 and the process ends.

Allen-Bradley Software Drivers and Interface Module 23

Figure 11:
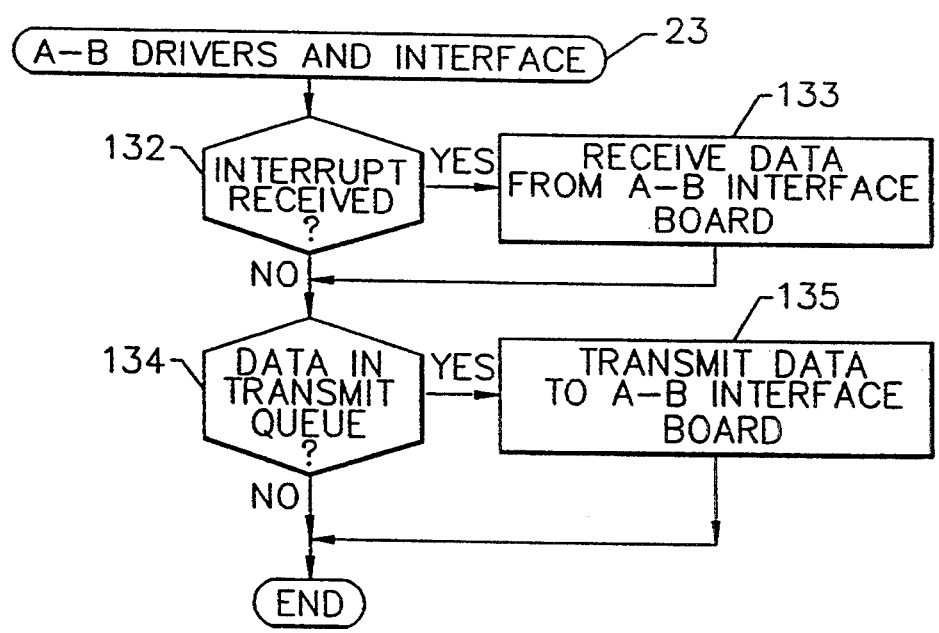
FIGS. 11–16 illustrate operations of the Allen-Bradley Interface module of FIG. 1.

Referring now to FIG. 11, an overview of the operation of the Allen-Bradley software drivers and interface module 23 (FIG. 1) will now be described. The Allen- Bradley software drivers and interface module 23 responds to interrupts, receives DH/DH+ protocol data from the Allen-Bradley interface board 18 and transmits data to the Allen-Bradley interface board 18. In the description which follows, the Allen-Bradley interface board 18 will also be referred to as the "KT card".

Referring to Block 132, when an interrupt is received, data is received from the Allen-Bradley interface board (KT card) 18 at Block 133. The detailed processing for receiving data will be described in FIG. 12. If data is in the transmit queue Block 134, then the data is transmitted to the Allen-Bradley interface board at Block 135. The detailed processing for transmitting data to the KT card will be described below in connection with FIG. 13. Control then returns to the control and diagnostics module (FIG. 17).

Figure 12:
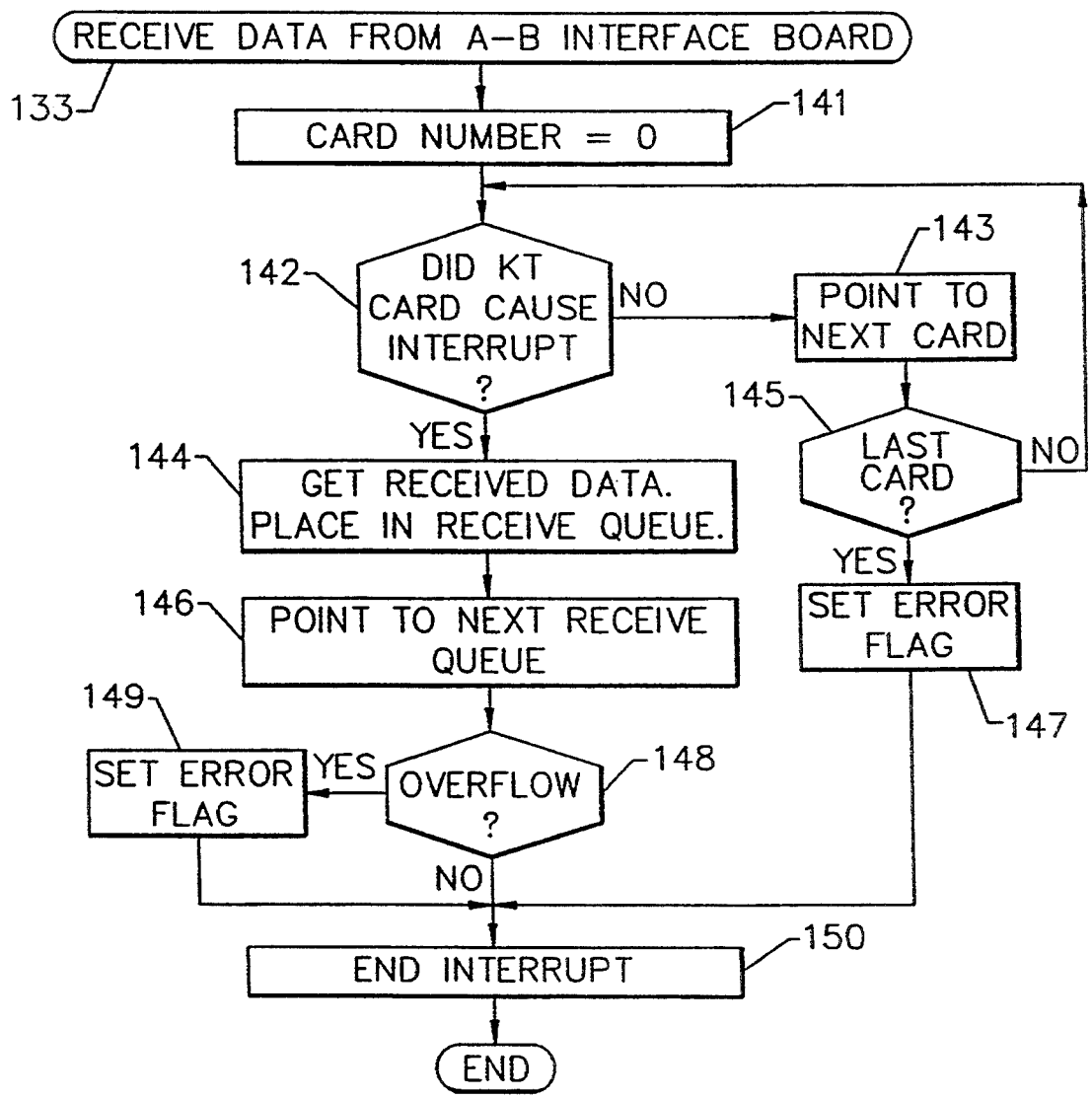

Referring now to FIG. 12, the detailed operations for receiving data from the Allen-Bradley interface board (KT card) (Block 133 of FIG. 11) will now be described. It will be understood that upon receipt of a DH/DH+ packet, a hardware interrupt is generated by the KT card 18. All the KT cards installed in the system share the same interrupt. Upon receipt of an interrupt, processing sets the card number to zero at Block 141 and then determines at Block 142 whether the KT card caused the interrupt. If the KT card did not cause an interrupt, the pointer is moved to the next card at Block 143. Assuming this was the last card in the system (Block 145), then an error flag is set at Block 147 for spurious interrupts.

Alternatively, returning to Block 142, if the KT card did cause the interrupt, then the received data is obtained from the KT card and placed in a receive queue at Block 144. A data valid flag is set and the next receive queue is pointed to at Block 146. If there is a receive queue overflow at Block 148, then an error flag is set at Block 149. Assuming there is no overflow, then an end of interrupt is issued at Block 150 and the process ends. The converter module 22 then obtains the receive queue and operates on the receive queue as was described above.

Figure 13:
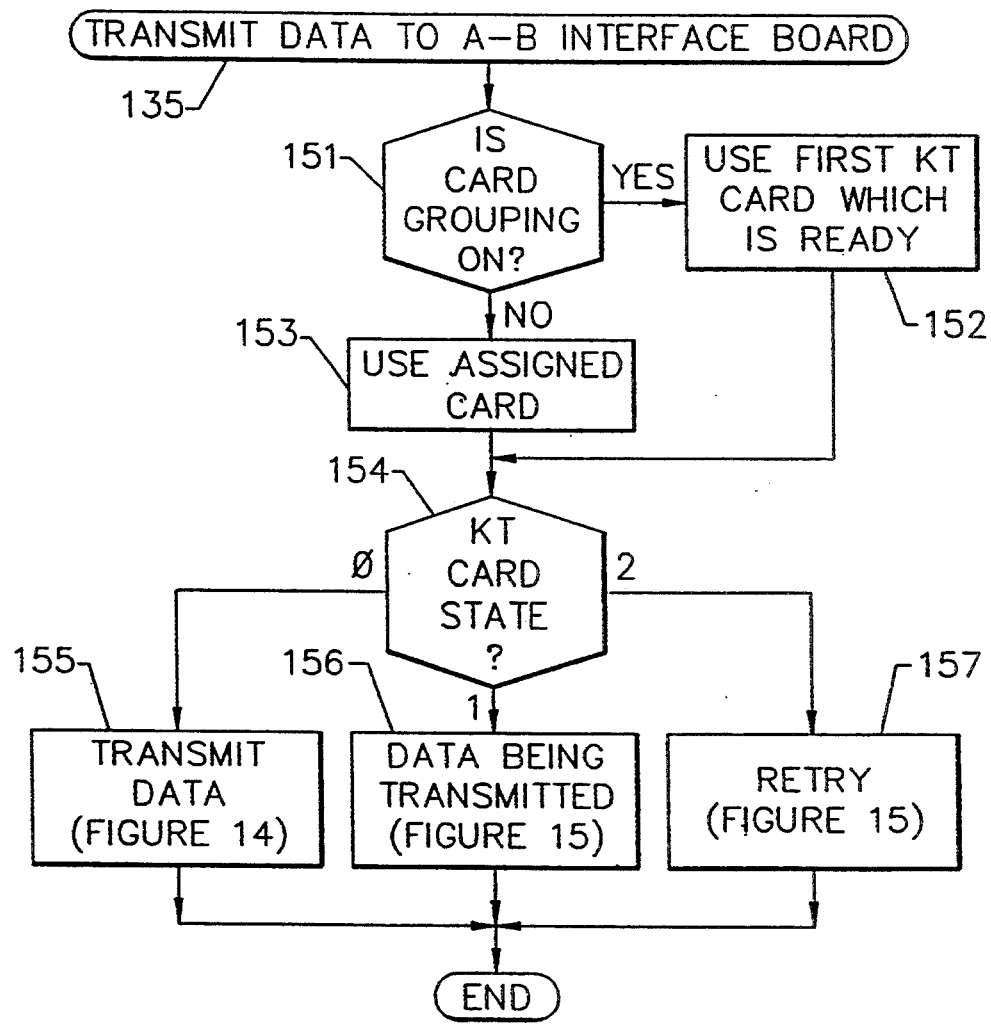

Referring now to FIG. 13, the operations for transmitting data to the Allen-Bradley interface board (KT card) (Block 135 of FIG. 11) will now be described. A test is first made as to whether card grouping is on. In other words, are particular KT cards assigned to particular Allen-Bradley Data Highway Plus networks or can any KT card be used. The test is made at Block 151. If card grouping is on, then the first KT card which is ready is used (Block 152). If card grouping is not on, the assigned card is used at Block 153. A test is then made at Block 154 for the KT card state. The valid KT card states are 0, 1 and 2. The 0 state (Block 155) corresponds to the state for transmitting data, i.e. for placing the data in the KT card memory, and will be described in detail in FIG. 14. The 1 state (Block 156) corresponds to the state where data is in the KT card memory and is being transmitted by the KT card, and will be described in detail in FIG. 15. The 2 state (Block 157) corresponds to the retry state, and will be described in detail in FIG. 16.

Figure 14:
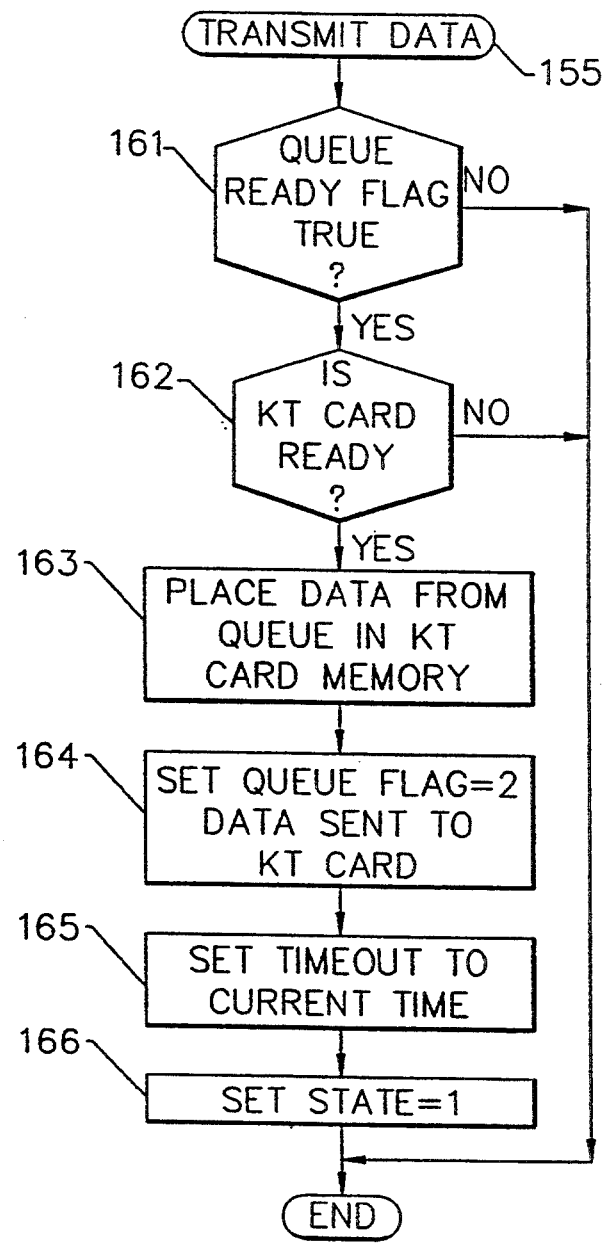

Referring now to FIG. 14, data is transmitted to the KT card (Block 155 of FIG. 13) by first testing, at Block 161, if the queue ready flag is true. If it is true, a test is made at Block 162 as to whether the KT card is ready for data. If yes, then at Block 163 data is placed from the queue into the KT card memory. At Block 164, the queue flag is set to 2 and data is sent to the KT card. At Block 165 a timeout is set to the current time and at Block 166 the state is set to 1.

Figure 15:
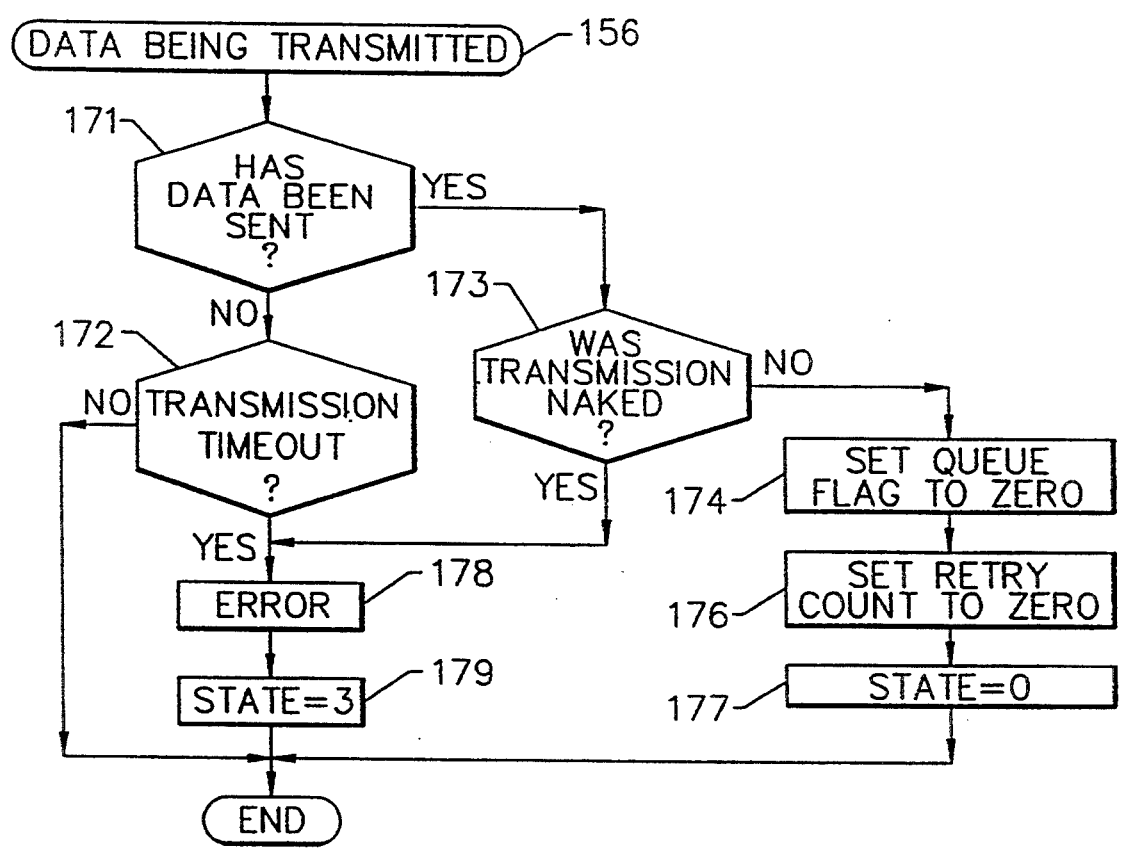

Referring now to FIG. 15, the processing performed after the data has been loaded into the KT card but has not yet been sent by the KT card to the Data Highway Plus network 12 (Block 156 of FIG. 13) will now be described. A test is first made if the data has been sent at Block 171. If not, a test is made at Block 172 as to whether a transmission timeout has occurred. If yes, then an error message is sent at Block 178 and the state is set to 3 at Block 179 so that a retry can be performed. If the data has been sent at Block 171, then a test is made at Block 173 as to whether the transmission was naked (i.e. contained no data) and if yes, an error message is sent. On the other hand if the transmission was not naked, then the queue flag is set to 0 at Block 174, the retry count is set to 0 (Block 176) and the state is set to 0 (Block 177) to allow another message queue to be sent. It will be understood that if any other non-valid state (i.e. a state other than 0, 1, or 2) is present for a KT card, processing also begins at Block 174 to clear the non-valid state.

Figure 16:
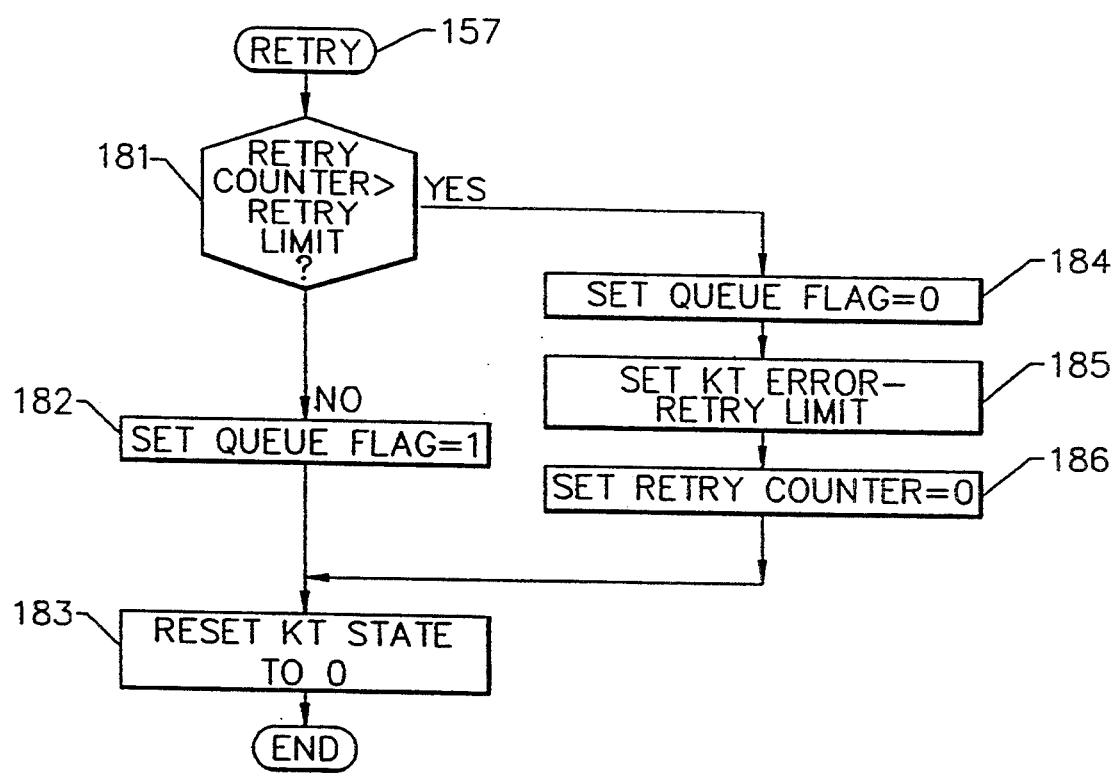

Referring now to FIG. 16, the operations performed for a retry (KT state equal 2) (Block 157 of FIG. 16) will now be described. A test is first made at Block 181 as to whether the retry counter is greater than the limit. If yes, then at Block 184, the queue flag is set to zero and a KT error is flagged at Block 185. The retry counter is then reset to 0 at Block 186. If the retry counter is not over the limit at Block 181, then the queue flag is set to 1 at Block 182 and the KT state is reset to 0 so that another transmission can be attempted at Block 183.

Control and Diagnostics Module 24

Referring now to FIG. 17, the processing performed by control and diagnostics module 24 (FIG. 1) will now be described. The control and diagnostic module processing begins by initializing the terminal server emulator 21, the converter 22 and the Allen-Bradley software drivers and interface at Block 187. At Block 188, if any initialization fails, a failure indicator is provided at Block 189. The failure indicator may be displayed on the display associated with computer 15 or may be in the form of an audible tone pattern or other known means.

Terminal server emulator module 21 is initialized by setting up the needed parameters for creating a predetermined number, such as four, ports and objects with the LAT engine 28 such as SuperLAT TM /DOS, and SuperLAT TM /DOS is told to create the requested ports/objects. Parameters are also set up for registering a host initiated callback routine with SuperLAT TM- /DOS for each port/object. Parameters are also set up for registering a "Data-B" callback routine with SuperLAT TM /DOS for each port/object which is created.

The KT card or cards 18 are initialized by setting up local variables, data structures and the number of cards in the system. Each KT card installed in the system is tested and the DH/DH+ protocol is loaded into each KT card's program memory. Interrupt vectors are set up and all interrupts are enabled for all KT cards which are installed.

Assuming initialization did not fail, then at Block 191 the DOS timer rate is changed from 55 milliseconds to 2 milliseconds to achieve higher Ethernet throughput from SuperLAT TM /DOS. Processing then begins at Block 192 by calling the processing for the terminal server emulator module 21 (FIG. 2), for the converter module 22 (FIG. 7), and for the Allen-Bradley software drivers and interface module 23 (FIG. 11). If run time diagnostics for any of the modules or components fail at Block 193, a failure is indicated at Block 194. Processing of the other three modules 21-23 then continues until exit is initiated at Block 195. Exit may be initiated by depressing a particular keyboard key, a particular keyboard sequence or other known means. Processing is then terminated at Block 196.

Accordingly, a high speed and low cost communications method and apparatus between the DEC Ethernet network using LAT protocol and an Allen-Bradley Data Highway/Data Highway Plus network has been provided, by eliminating the need to use a DEC terminal server and Allen-Bradley KE/KF2 interface modules with their 9600 baud and 19.2 Kbaud limitations. Terminal server emulator module 21, converter module 22 and Allen-Bradley software drivers and interface module 23 operate to strip the LAT protocol from a DEC Ethernet network packet and leave DF1 formatted data, and to convert the DF1 data into DH/DH+ protocol data. DH/DH+ protocol data is also converted to DF1 data and formatted into LAT packets for transmission to the DEC Ethernet network. The invention may be practiced using a commercially available LAT engine 28, Ethernet interface port 17 and Allen-Bradley interface port 18 and software modules described in detail above. A high speed, low cost bridge is thereby provided between the networks to reduce or eliminate data bottlenecks.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A data communications system comprising:
    a first local area network for communicating data in LAT protocol packets containing DF1 format;
    a second local area network for communicating data using DH/DH+ protocol;
    terminal server emulating means, electrically connected to said first local area network, for stripping said LAT protocol from data received from said first local area network to provide DF1 format data; and
    converting means, electrically connected to said terminal server emulating means and to said second local area network, for converting said DF1 data into data using DE/DE+ protocol and transmitting said data using DH/DH+ protocol to said second local area network, and for converting data using DH/DH+ protocol into DF1 data and transmitting said DF1 data to said terminal server emulating means, said terminal server emulating means further including means for placing said DF1 data in LAT packets and transmitting said LAT packets to said first local area network;
    wherein said DF1 data received from said terminal server emulating means adds to the DF1 data a transaction number and wherein said converting means comprises means for removing said transaction number from said DF1 data and substituting a pseudo transaction number therefor, and wherein said DH/DH+ protocol data received from said second local area network includes said pseudo transaction number and wherein said converting means further comprises means for removing said pseudo transaction number from DH/DH+ protocol data received from said second local area network and replacing the pseudo transaction number with the associated transaction number.

2. The system of claim 1 further comprising:
    at least one manufacturing operations control computer electrically connected to said first local area network, for transmitting DF1 format data thereto and receiving DF1 format data therefrom in LAT protocol; and
    at least one programmable logic controller electrically connected to said second local area network, for transmitting DH/DH+ protocol data thereto and receiving DH/DH+ protocol data therefrom.

3. The system of claim 1 wherein said terminal server emulating means comprises a LAT engine and means for controlling said LAT engine to strip LAT protocol from data received from said first local area network to provide DF1 format data, and to place DF1 data received from said converting means into LAT packets.

4. The system of claim 1 further comprising a plurality of second network interfacing means, and means for routing data in DH/DH+ protocol received from said converting means to a predetermined one of said second network interfacing means.

5. The system of claim 1 wherein said terminal server emulating means and said converting means are implemented by software modules executing on a general purpose microcomputer, said general purpose microcomputer including a central processing unit for executing said emulating means and said converting means, and a data bus electrically connected to said central processing unit, said system further comprising:
    at least one Ethernet interface board, electrically connected between said data bus and said first local area network; and
    at least one Allen-Bradley interface board connected between said data bus and said second local area network.

6. The system of claim 5 wherein said at least one Allen-Bradley interface board is at least one Allen-Bradley KT card.

7. The system of claim 5 wherein said system comprises a plurality of Allen-Bradley interface boards, and means for routing data in DH/DH+ protocol received from said converting means to a predetermined one of said Allen-Bradley interface boards.

8. A data communications bridge for communicating between LAT protocol data using DF1 format and DM/DH+ protocol data, said data communications bridge comprising:
    terminal server emulating means, for stripping said LAT protocol from said LAT protocol data to provide DF1 format data; and
    converting means, electrically connected to said terminal server emulating means, for converting said DF1 data into data using DH/DH+ protocol, and for converting data using DH/DH+ protocol into DF1 data and transmitting said DF1 data to said terminal server emulating means, said terminal server emulating means further including means for placing said DF1 data in LAT packets;
    wherein said DF1 data received terminal server emulating means adds to DF1 data a transaction number and wherein said converting means comprises means for removing said transaction number from said DF1 data and substituting a pseudo transaction number therefor, and wherein said DH/DH+ protocol data received from said second local area network includes said pseudo transaction number and wherein said converting means further comprises means for removing said pseudo transaction number from DH/DH+ protocol data and replacing the pseudo transaction number with the associated transaction number.

9. The data communications bridge of claim 8 wherein said terminal server emulating means comprises a LAT engine and means for controlling said LAT engine to strip LAT protocol from said LAT protocol data to provide said DF1 format data, and to place DF1 data received from said converting means into LAT packets.

10. The data communications bridge of claim 8 further comprising a plurality of network interfacing means, and means for routing data in DH/DH+ protocol received from said converting means, to a predetermined one of said network interfacing means.

11. The data communications bridge of claim 8 wherein said terminal server emulating means and said converting means are implemented by software modules executing on a general purpose microcomputer, said general purpose microcomputer including a central processing unit for executing said emulating means and said converting means, and a data bus electrically connected to said central processing unit, said data communications bridge further comprising:
 at least one Ethernet interface board, electrically connected to said data bus; and
 at least one Allen-Bradley interface board connected to said data bus.

12. The data communications bridge of claim 11 wherein said at least one Allen-Bradley interface board is at least one Allen-Bradley KT card.

13. The data communications bridge of claim 11 wherein said at least one Allen-Bradley interface board comprises a plurality of Allen-Bradley interface boards, and means for routing data in DH/DH+ protocol received from said converting means to a predetermined one of said Allen-Bradley interface boards.

14. A network bridge for communicating data between a first local area network which operates in LAT protocol using DF1 format and a second local area network which operates in DH/DH+ protocol, said network bridge comprising:
 a central processing unit;
 a data bus electrically connected to said central processing unit;
 at least one Ethernet interface board, electrically connected to said data bus;
 at least one Allen-Bradley interface board, electrically connected to said data bus;
 a LAT engine executing on said central processing unit;
 means, executing on said central processing unit, for controlling said LAT engine to strip LAT protocol from data received from said Ethernet interface board to provide DF1 format data; and
 converting means, executing on said central processing unit, for converting said DF1 data into data using DH/DH+ protocol and transmitting said data using DH/DH+ protocol to said Allen-Bradley interface board, and for converting data using DH/DH+ protocol into DF1 data and transmitting said DF1 data to said LAT engine controlling means, said LAT engine controlling means further including means for controlling said LAT engine to place said DF1 data in LAT packets and to transmit said LAT packets to said Ethernet interface board;
 wherein said DF1 data received by said converting means from said LAT engine controlling means adds to the DF1 data a transaction number and wherein said converting means comprises means for removing said transaction number from said DF1 data and substituting a pseudo transaction number therefor, and wherein said DH/DH+ protocol data received from said second local area network includes said pseudo transaction number and wherein said converting means further comprises means for removing said pseudo transaction number from DH/DH+ protocol data received from said Allen-Bradley interface board, and replacing the pseudo transaction number with the associated transaction number.

15. The network bridge of claim 14 wherein said at least one Allen-Bradley interface board is at least one Allen-Bradley KT card.

16. The network bridge of claim 14 wherein said at least one Allen-Bradley interface board comprises a plurality of Allen-Bradley interface boards, said network bridge further comprising means, executing on said central processing unit, for routing data in DH/DH+ protocol received from said converting means, to a predetermined one of said Allen-Bradley interface boards.

17. A computer-based method for communicating data between a first local area network which operates in LAT protocol using DF1 format and a second local area network which operates in DH/DH+ protocol, said method comprising the following steps executed on a data processing system:
 stripping said LAT protocol from data received from said first local area network to provide DF1 format data;
 converting said DF1 data into data using DH/DH+ protocol;
 transmitting said data using DH/DH+ protocol to said second local area network;
 receiving data using DE/DH+ protocol from said second local area network;
 converting received data using DH/DH+ protocol into DF1 data;
 placing said DF1 data in LAT packets; and
 transmitting said LAT packets to said first local area network;
 wherein said DF1 data received from said first local area network adds to the DF1 a transaction number and wherein said step of converting said DF1 data comprises the steps of:
 removing said transaction number from said DF1 data; and
 substituting a pseudo transaction number therefor;
 and wherein said DH/DH+ protocol data received from said second local area network includes said pseudo transaction number, and wherein said step of converting received data comprises the steps of:
 removing said pseudo transaction number from DH/DH+ protocol data received from said second local area network; and
 replacing the pseudo transaction number with the associated transaction number.

18. The method of claim 17 wherein said stripping step comprises the step of emulating a terminal server to thereby strip said LAT protocol from data received from said first local area network to provide DF1 format data.

19. A computer-based method for communicating data between a first local area network which operates in LAT protocol using DF1 format and a second local area network which operates in DH/DH+ protocol, said method comprising the following steps executed on a data processing system:

stripping said LAT protocol from data received from said first local area network to provide DF1 format data;

converting said DF1 data into data using DH/DH+ protocol;

transmitting said data using DH/DH+ protocol to said second local area network;

receiving data using DH/DH+ protocol from said second local area network;

converting received data using DH/DH+ protocol into DF1 data;

placing said DF1 data in LAT packets; and transmitting said LAT packets to said first local area network;

wherein said DF1 data received from said first local area network adds to the DF1 data a source field and a transaction number, and wherein said step of converting said DF1 data comprises the steps of:

removing the source field from said DF1 data;

building a DH/DH+ header;

removing the transaction number from the DF1 data;

forming a pseudo transaction number;

placing the pseudo transaction number in said DH/DH+ header; and storing the source field, transaction number and pseudo transaction number;

and wherein said received data includes said pseudo transaction number and wherein said step of converting received data comprises the steps of:

building a DF1 header;

replacing the pseudo transaction number with the associated stored transaction number; and placing the associated stored source field in the DF1 header.

* * * * *